Jan. 4, 1966 MASANOBU TADA 3,227,457

MAGNETIC RECORDING AND REPRODUCING SYSTEM

Filed July 6, 1961 2 Sheets-Sheet 1

Inventor
Masanobu Tada by Hill, Sherman, Meroni, Gross & Simpson Attys

MAGNETIC RECORDING AND REPRODUCING SYSTEM

Filed July 6, 1961

2 Sheets-Sheet 2

Inventor
Masanobu Tada by Hill, Sherman, Meroni, Gross & Simpson Attys.

United States Patent Office 3,227,457

Patented Jan. 4, 1966

3,227,457
MAGNETIC RECORDING AND REPRODUCING SYSTEM

Masanobu Tada, Tokyo, Japan, assignor to Sony Corporation, Tokyo, Japan, a corporation of Japan Filed July 6, 1961, Ser. No. 122,142
Claims priority, application Japan, July 8, 1960, 35/31,048
8 Claims. (Cl. 274—4)

This invention relates to a magnetic recording and reproducing system wherein signals are recorded and reproduced by scanning along successive lines extending generally in the direction of the width dimension of a wide and long magnetic sheet or tape which is moving in the direction of its length dimension.

In such a magnetic recording and reproducing system it has heretofore been proposed that a signal be recorded by means of a plurality of magnetic heads rotating about a common axis and moving along a common circular path which is arranged so that a portion of the circular path extends across the width dimension of the record medium. By way of example, a practical rotating head system of this type may comprise a plurality of magnetic heads mounted on a rotary disk with substantially equal angles between the heads and with the disk disposed at right angles to a magnetic tape which is formed into an arcuate configuration across its width so as to conform to a segment of the circular path of the heads. This system, however, is inconvenient because of its large size and its complicated structure.

Therefore, one object of this invention is to provide a magnetic recording and reproducing system which is small in size and simple in construction, and yet wherein magnetic recording and reproducing may be effected on a wide magnetic sheet by scanning along successive straight or arcuate lines extending generally in the direction of the width dimension of the sheet.

Another object of this invention is to provide a magnetic recording and reproducing system which is reliable in operation and wherein a plurality of magnetic heads have a substantially reciprocatory movement and successively scan a magnetic sheet along straight or arcuate paths extending generally in the direction of the width dimension of the magnetic sheet.

A further object of this invention is to provide a magnetic recording and reproducing system wherein a plurality of magnetic heads reciprocate back and forth across the width dimension of a comparatively wide record medium along straight lines or circular arcs with the heads being active in sequence and arranged to scan lines on the record medium of a spacing to make the best use of the available area of the record medium.

A still further object of this invention is to provide a magnetic recording and reproducing system wherein a record medium is scanned along straight lines or circular arcs extending generally transversely to the direction of movement of the record medium by means of a plurality of heads reciprocating back and forth across the record medium and activated in sequence without any loss of signal (dropout) in switching from one head to the other.

Other objects, features and advantages of this invention will become fully apparent from the following description taken in connection with the accompanying drawings, in which.

Figure 1:
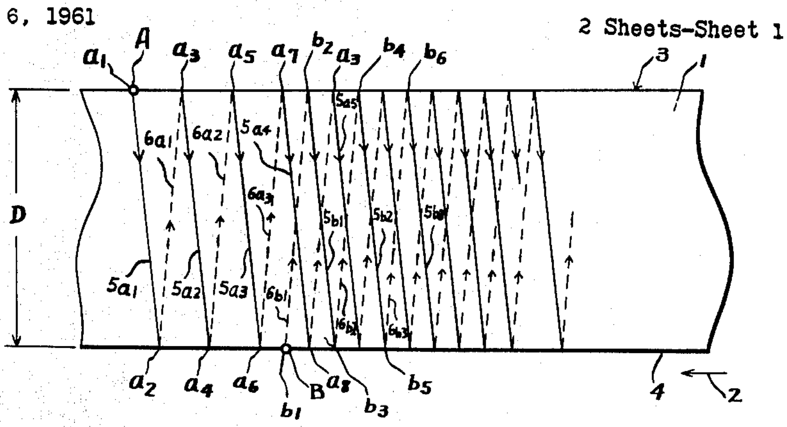
FIGURE 1 is a fragmentary diagrammatic view illustrating how recording tracks are formed on a magnetic record tape in a magnetic recording and reproducing system according to this invention.
Figure 2:
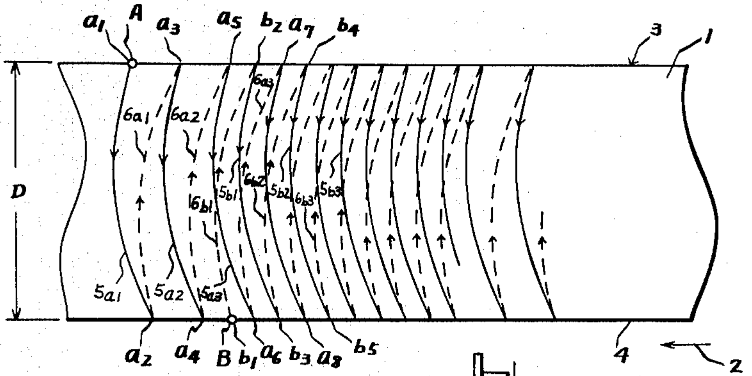
FIGURE 2 is a fragmentary diagrammatic view illustrating another form of scanning in a magnetic recording and reproducing system according to this invention.

In the embodiments of the present invention shown in FIGURES 1 and 2, two magnetic heads A and B are provided, which magnetic heads reciprocate along paths extending substantially at right angles to the direction of advance of a magnetic record medium 1 and move across the entire width D of the record starting from respective opposite sides of the record medium and moving in opposite directions. That is, the heads scan the magnetic sheet reciprocably between the edges 3 and 4 in such a way that when one magnetic head A moves from the edge 3 to the edge 4, the other magnetic head B moves from the edge 4 to the edge 3 which is in the opposite direction. The path of the magnetic head A connecting points $a_1$ and $a_2$, $a_3$ and $a_4$, and so forth on the record medium shown by the full lines 5$a_1$, 5$a_2$, etc. represent the active scanning paths of head A on the record medium as the head moves from edge 3 to edge 4 of the record medium and the record medium moves at a relatively slow speed in the direction of arrow 2. As head A moves from edge 4 to edge 3 of the record medium along paths on the record medium such as indicated by dash lines 6$a_1$, 6$a_2$, and 6$a_3$, no signal is recorded by head A. On the other hand, the head B is inactive as it moves from point $b_1$ to point $b_2$ on the record medium but is active as it moves from point $b_2$ to point $b_3$. The head B thus is inactive as it moves along dash lines 6$b_1$, 6$b_2$, 6$b_3$, etc. while being active as it moves along solid lines 5$b_1$, 5$b_2$, 5$b_3$, etc. As indicated in FIGURE 1, as head A moves from point $a_1$ to point $a_2$ on the record medium, head B moves from point $b_1$ to point $b_2$. Similarly, as head A moves from point $a_2$ to point $a_3$, head B moves from point $b_2$ to point $b_3$. Both heads A and B are active only as they travel from edge 3 to edge 4 of the tape, but of course this occurs at different times for the two heads. It will be noted that heads A and B are offset a distance in the direction of arrow 2 such that a line of magnetization recorded by head A such as indicated at $5a_5$ is midway between lines such as $5b_1$ and $5b_2$ recorded by head B. Specifically head B is spaced from head A a distance equal to slightly more than 2½ times the spacing between successive lines recorded by head A.

Figure 3:
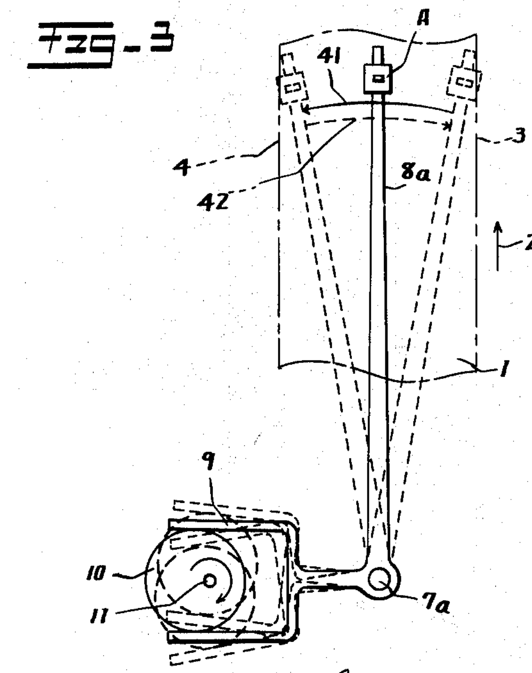
FIGURE 3 is a diagrammatic plan view illustrating the principal parts of a head driving device for one of the magnetic heads in a scanning system such as indicated in FIGURE 2.
Figure 4:
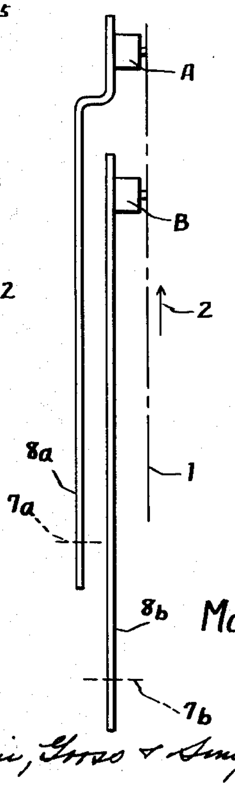
FIGURE 4 is a diagrammatic side elevational view of the system of FIGURES 2 and 3, the driving devices for both heads being shown.

FIGURES 3 and 4 illustrate a system for producing arcuate lines of magnetization as represented in FIGURE 2. In this case heads A and B are mounted on the free ends of respective movable arms 8*a* and 8*b* which are mounted for oscillatory movement about shafts 7*a* and 7*b*, respectively. Each of the arms 8*a* and 8*b* has a fork associating lever 9 which is engaged with a rotary cam 10. The reference numeral 11 designates the driving shaft of the cam. Thus, the magnetic heads A and B move back and forth across the width of the magnetic sheet 1 once for every revolution of the rotary cam 10. The shaft 11 is continually driven from a suitable electric motor to produce scanning paths on the record sheet as indicated in FIGURE 2. FIGURE 4 illustrates the relationship between the two magnetic heads A and B which are respectively mounted on the movable arms 8*a* and 8*b* having pivots 7*a* and 7*b*. The arms 8*a* and 8*b* are of exactly the same effective radius but are arranged on different levels with respect to the surface of the record sheet so as to avoid interference therebetween. The pivot shafts 7*a* and 7*b* are offset in the direction of movement of sheet 1 the same distance as the heads A and B.

Figure 5:
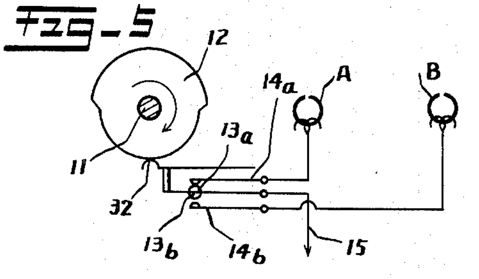
FIGURE 5 is a diagrammatic view illustrating means for sequentially activating the heads of FIGURE 4.

In such a construction, in order to record signals with the magnetic heads A and B alternately tracing effective scanning lines, as shown in FIGURE 5, a cam 12 is mounted on the rotary shaft 11 in such a way that the cam 12 may revolve in synchronization with rotation of the cam 10 for each arm 8*a* and 8*b*. Movable contact points 13*a* and 13*b* are integrally formed and carried by an assembly 32 riding on the periphery of the cam 12. Contacts 13*a* and 13*b* cooperate with a normally closed contact 14*a* and a normally opened contact 14*b*, respectively. The contact points 14*a* and 14*b* are connected respectively to the magnetic heads A and B, and a signal from the terminal 15 is fed through the contact points 13*a*, 13*b*, 14*a* and 14*b* to the heads, whereby the signal to be supplied to the magnetic heads may be switched cyclically from one head to the other. In this instance, with the motion of the cam 12 coupled to the movable contact points 13*a*, 13*b*, opening and closing of the contacts 13*a*, 14*a* and 13*b*, 14*b* occur substantially at every half revolution of the cam 12. In practice, however, the shape of the cam and the switching configuration is so chosen that signals may be recorded by the magnetic heads A and B which overlap each other in time, whereby drop out of the signal may be avoided. For example the switch may be of the make-before-break type so that contacts 13*b*, 14*b* close before 13*a*, 14*a* open, and 13*a*, 14*a* close before 13*b*, 14*b* open.

Figure 6:
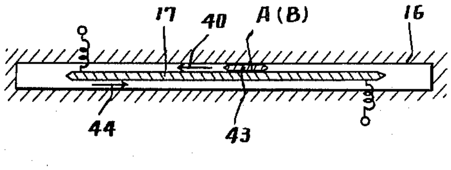
FIGURE 6 is a diagrammatic cross sectional view of a device for mechanically disengaging the heads of FIGURE 4 from the record tape during return sweeps across the tape.

FIGURE 6 shows a mechanical head switching arrangement for use instead of the electrical switch of FIGURE 5. In this structure, a stationary guide member 16 is provided, in which a dashboard 17 is arranged. The magnetic heads A and B or the arms 8*a* and 8*b* each have a part 43 which extends through a guide member such as 16 and moves in the direction of arrow 40 when above the dashboard 17 which corresponds to the direction of arrow 41 in FIGURE 3, during the time when the head is in engagement with the record sheet 1. On the return sweep of each head as indicated by arrow 42 in FIGURE 3, the head part 43 will be below dashboard 17 and traveling in the direction of arrow 44 in FIGURE 6, and will hold the head out of engagement with the record sheet.

Figure 7:
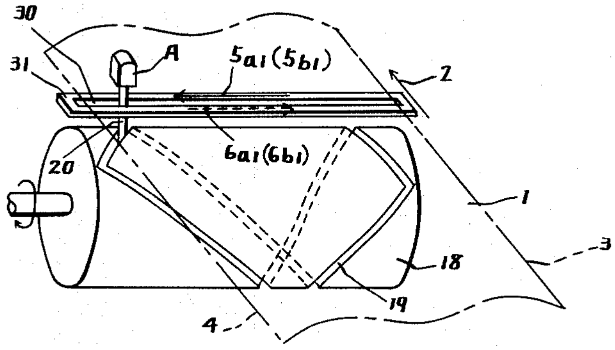
FIGURE 7 is a fragmentary perspective view diagrammatically illustrating a device for producing straight line scanning of a record medium as in FIGURE 1.

FIGURE 7 shows a linear scanning system of the type indicated in FIGURE 1 wherein a rotary cylinder 18 has a closed spiral guide member, for example, a groove 19 which serves to guide a pin 20 projecting from the head. The pin 20 also rides in a straight groove 30 which is formed in another guide member 31 and extends across the magnetic sheet 1 so that the magnetic head will traverse the sheet 1 along a straight line path.

Thus, magnetic head A is guided by the grooves 19 and 30 during rotation of the rotary cylinder 18, so that straight lines are traced on the sheet. The same type of device can be provided for the magnetic head B. Thus, two such devices can be so assembled that the magnetic heads A and B are made to run in opposite directions to form the straight scanning lines as shown in FIGURE 1. The magnetic heads are changed over mechanically or electrically in the same manner as has been described in connection with FIGURE 5 or 6. In this instance, the spiral groove 19 will be so formed that the magnetic head moves with as nearly constant speed as possible for the effective scanning movement, while moving at a higher speed for the return ineffective scanning movement.

Figure 8:
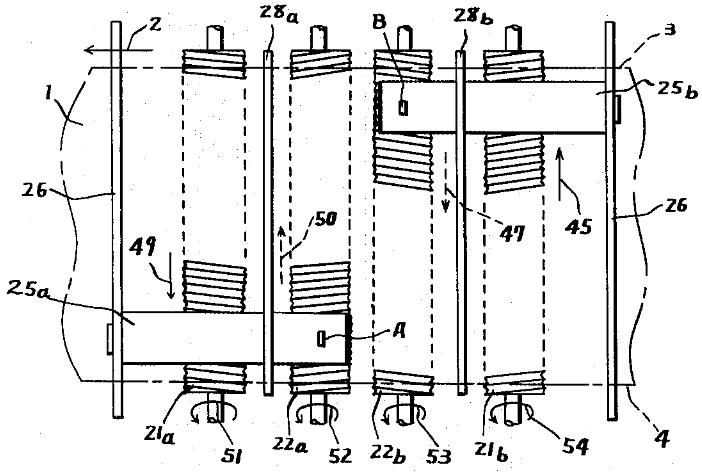
FIGURE 8 is a diagrammatic plan view of another arrangement for providing straight line scanning of the record medium as illustrated in FIGURE 1.
Figure 10:
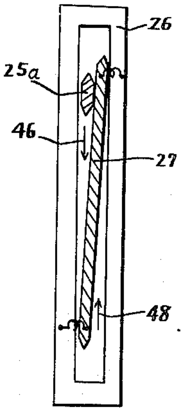
FIGURE 10 is a fragmentary vertical sectional view of the device of FIGURE 8.
Figure 9:
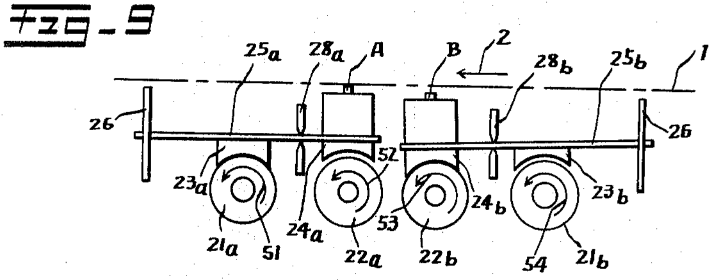
FIGURE 9 is a diagrammatic side elevational view of the arrangement of FIGURE 8.

FIGURES 8, 9 and 10 illustrate another embodiment in which straight scanning lines are traced on the record medium as indicated in FIGURE 1. A pair of feed screws 21*a*, 22*a* are arranged to drive head A in respective opposite directions, and a pair of feed screws 21*b*, 22*b* drive head B. The magnetic heads A and B are respectively mounted on arms 25*a* and 25*b* provided with, for instance, half nuts 23*a*, 24*a* and 23*b*, 24*b* to be respectively meshed with pairs of feed screws 21*a*, 22*a* and 21*b*, 22*b*. The feed screws of each pair may be oppositely threaded as shown in FIGURE 8 or be rotated in opposite directions. The arms 25*a* and 25*b* are pivoted on stationary check plates 28*a* and 28*b*, respectively. In order that the half nuts 23*a* and 24*a*, 23*b* and 24*b* may be engaged alternately with their respectively corresponding feed screws 21*a* and 22*a*, 21*b* and 22*b*, at the free ends of the arms 25*a* and 25*b* there is provided the frame guide member 26 similar to that shown in FIGURE 6, wherein a dash-board 27 is placed. The free ends of the arms 25*a* and 25*b* are made to run around the dashboard 27. Thus, the magnetic head A, for instance, contacts with the sheet 1 as it moves in the direction of arrow 49 in FIGURE 8 corresponding to the direction of arrow 46 in FIGURE 10, and is out of engagement with the sheet as it moves in the direction of arrow 50 in FIGURE 8 and arrow 48 in FIGURE 10. The magnetic heads A and B thus form effective scanning lines when moving in the direction of arrows 45, 49 in FIGURE 8 but are ineffective during scanning in the direction of arrows 47 and 50. By driving feed screws 21*a*, 22*a* and 21*b*, 22*b* in the directions indicated by arrows 51–54 at constant speed, the scanning pattern indicated in FIGURE 1 is executed.

According to this invention as above described, the two magnetic heads scan the sheet in the width direction alternately, whereby signals may be recorded and reproduced along straight or arcuate lines across the record medium. During the effective scanning period of one magnetic head, the other head is brought to an effective scanning position; hence dropout of signals may be eliminated during the interval when a reciprocably scanning head is reversing its direction of movement without employing a complicated structure.

It will be apparent that many modifications and variations may be effected without departing from the scope of the novel concepts of this invention.

I claim as my invention:

1. A magnetic recording and reproducing system for cooperation with a magnetic sheet traveling with a predetermined speed, comprising two magnetic heads, means for moving the heads with a substantially reciprocating motion transversely to the direction of movement of the sheet and through respective paths which are offset in the direction of movement of the sheet with the heads moving in straight lines during at least a portion of their motion, and means for sequentially activating said heads to scan the area of the sheet as the sheet travels successively across the paths of said heads with the paths of the heads being straight during activation thereof.

2. A magnetic recording and reproducing system for cooperation with a magnetic sheet traveling with a predetermined speed, comprising a pair of rotary cylinders disposed transversely to the path of the sheet and each having a closed spiral groove, a magnetic head guided by each of said closed spiral grooves, guide means for guiding each of said magnetic heads to move in the direction of the axis of the associated rotary cylinder, said cylinders driving the respective heads back and forth across the sheet as the cylinders are continuously rotated, and means for alternately activating said heads to scan the area of the said sheet.

3. A signal transducing system comprising elongated record medium having an active surface at one side thereof for movement along a record medium path, first and second transducer heads at said one side of said record medium for scanning cooperation with a portion of said active surface of said record medium while the portion is essentially flat in the transverse direction, means for reciprocally moving the heads across the record medium path along respective head paths which are spaced from each other with the heads moving unidirectionally along straight lines during respective first and second scanning intervals to trace respective first and second straight scanning lines on the record medium active surface and moving along respective head return paths during respective first and second return intervals, and means for activating said first and second heads during the respective first and second scanning intervals and for deactivating said first and second heads during the respective first and second return intervals to provide for a transducing operation of said heads during unidirectional movement thereof along said first and second straight scanning lines respectively with the successive first and second scanning lines being coordinated to efficiently utilize the area of said active surface of said record medium.

4. A signal transducing system comprising an elongated record medium having an active surface at one side thereof for movement along a record medium path, first and second transducer heads at said one side of said record medium for scanning cooperation with said active surface of said record medium, means for reciprocally moving the heads across the record medium path along respective rectilinear head paths which are spaced from each other with the heads moving unidirectionally during respective first and second scanning intervals to trace respective first and second scanning lines on the record medium active surface and moving along respective head return paths during respective first and second return intervals, means for activating said first and second heads during the respective first and second scanning intervals and for deactivating said first and second heads during the respective first and second return intervals to provide for a transducing operation of said heads during unidirectional movement thereof along said first and second scanning lines respectively with the positions of the successive first and second scanning lines on the record medium being coordinated to efficiently utilize the area of said active surface of said record medium, said reciprocally moving means moving the heads at greater speed during the return intervals and the first and second scanning intervals overlapping each other in time to provide continuous scanning of said active surface of said record medium by said first and second heads.

5. A signal transducing system comprising an elongated record medium having an active surface at one side thereof for movement along a record medium path, first and second transducer heads at said one side of said record medium for scanning cooperation with a portion of said active surface of said record medium while said portion is in an essentially flat condition with respect to the transverse direction, means for reciprocally moving the heads cyclically across the record medium path along respective rectilinear head paths which are spaced from each other with the heads moving unidirectionally in a straight line during respective first and second scanning intervals to trace respective first and second straight scanning lines on the record medium active surface and moving along respective head return paths during respective first and second return intervals, means for activating said first and second heads during the respective first and second scanning intervals and for deactivating said first and second heads during the respective first and second return intervals to provide for a transducing operation of said heads during unidirectional movement thereof along said first and second straight scanning lines respectively with the positions of the successive first and second scanning lines being coordinated to substantially uniformly cover the area of said active surface of said record medium, the first and second scanning intervals overlapping each other successively in time to provide continuous scanning of said active surface of said record medium by said heads, electric circuit means for connection with said first head during said first scanning interval and for connection with said second head during said second scanning interval, and electric switching means for disconnecting said first head from said electric circuit means between successive first scanning intervals and for disconnecting said second head from said electric circuit means between successive second scanning intervals, and said reciprocally moving means moving said first and second heads at substantially constant speed throughout the respective first and second scanning intervals.

6. A signal transducing system comprising an elongated record medium having an active surface at one side thereof for movement along a record medium path, a plurality of transducer heads said one side of said record medium for scanning cooperation with said active surface of said record medium, means for moving the heads cyclically across the record medium path to trace successive scanning lines generally transversely to the direction of movement of the record medium, means for activating said heads during respective scanning time intervals which are offset in time with a first of said heads being activated for scanning along a first scanning line on the surface of the record medium during a first scanning interval in each cycle of movement of the first head and with a second of said heads being activated for a second scanning interval in each cycle of movement of the second head which second scanning interval is offset in time with respect to said first scanning interval to trace a second scanning line transversely across the record medium, said first and second heads having cycles of movement whose time duration are equal and having a spacing along the record medium path which is related to the distance of movement of the record medium in each cycle of movement of one of said heads so that the second scanning lines traced by the second head are interposed between successive first scanning lines traced by the first head, the first scanning lines traced by the first head being in alignment with the second scanning lines traced by the second head in the direction of movement of the record medium, said head moving means comprising rotary members having axes of rotation disposed transversely to the path of the record medium and having helical groove means for moving the first and second heads in one direction transversely of the record medium path during the respective first and second scanning intervals and for moving the heads in an opposite direction in respective first and second return intervals.

7. The transducing system of claim 6 with said first and second scanning intervals having a time duration substantially greater than said return intervals to provide for a time overlap between said first and second scanning intervals.

8. A signal transducing system comprising an elongated record medium having an active surface at one side thereof for movement along a record medium path, a plurality of transducer heads at said one side of said record medium for scanning cooperation with respective portions of said active surface of said record medium while said portions are essentially in a flat condition with respect to the transverse direction, means for moving the heads with a cyclical reciprocating motion in said transverse direction with each of the heads repeatedly retracing a head path in space in successive cycles and with said heads moving through respective different head paths in space which are spacially offset from each other, and means constraining said heads to move precisely in a straight line without curvature in any plane during respective scanning intervals while the respective heads are in scanning relation to said active surface of said record medium.

References Cited by the Examiner

UNITED STATES PATENTS

| | | | |
|---|---|---|---|
| 2,876,295 | 3/1959 | Irby | 179—100.2 |
| 2,962,559 | 11/1960 | Hoshino et al. | 274—4.2 X |
| 3,020,355 | 2/1962 | Moriya | 179—100.2 |

NORTON ANSHER, *Primary Examiner.*

JOHN P. WILDMAN, *Examiner.*